Jan. 2, 1951 Z. G. HAYGOOD 2,536,547

PHONOGRAPH RECORD FILING CABINET

Filed Dec. 3, 1947 2 Sheets-Sheet 1

Zack G. Haygood
INVENTOR.

BY Clarence A. O'Brien
and Harvey B. Jacobson
Attorneys

Jan. 2, 1951 | Z. G. HAYGOOD | 2,536,547

PHONOGRAPH RECORD FILING CABINET

Filed Dec. 3, 1947 | 2 Sheets-Sheet 2

Zack G. Haygood
INVENTOR.

BY Clarence A. O'Brien
and Harvey B. Jacobson
Attorneys

Patented Jan. 2, 1951 2,536,547

UNITED STATES PATENT OFFICE 2,536,547

PHONOGRAPH RECORD FILING CABINET

Zack G. Haygood, Atlanta, Ga.

Application December 3, 1947, Serial No. 789,413

3 Claims. (Cl. 312—13)

This invention relates to new and useful improvements in cabinets and the primary object of the present invention is to provide a record cabinet including a housing and a record supporting case pivoted for movement into and out of position within the housing.

Another important object of the present invention is to provide a phonograph record filing cabinet including a record filing case so designed as to facilitate records to be retained in a staggered relation for convenience in the removal of a selected record from the case.

A further object of the present invention is to provide a cabinet of the aforementioned character embodying novel and improved means for limiting the pivotal movement of the record holding case into and out of position in the housing.

A still further aim of the present invention is to provide a record filing cabinet that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1:
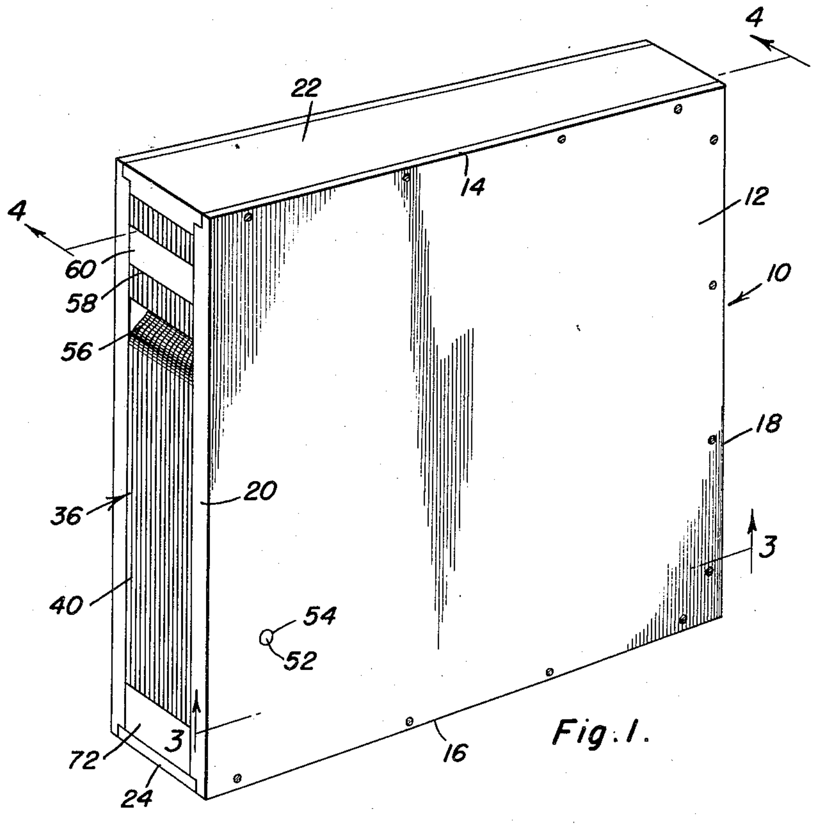
Figure 1 is a perspective view of the present record cabinet, and showing the record case pivoted into position within the housing.
Figure 3:
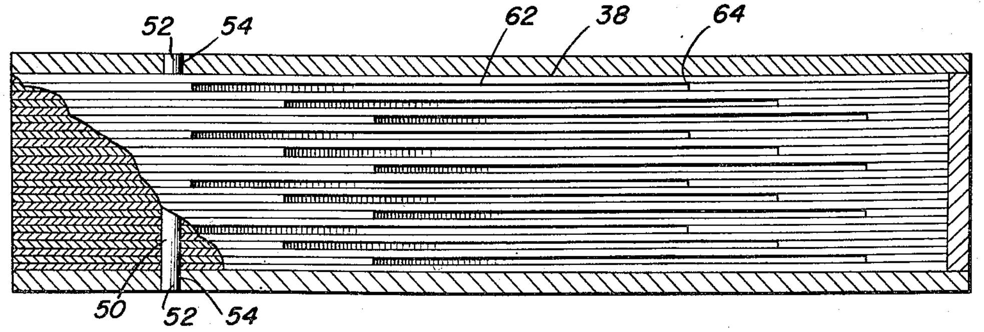
Figure 3 is a longitudinal horizontal sectional view taken substantially on the plane of section line 3—3 of Figure 1, and with parts of the case broken away and shown in section; and, Figure 4 is a vertical sectional view taken substantially on the plane of section line 4—4 of Figure 1.
Figures 2, 4:
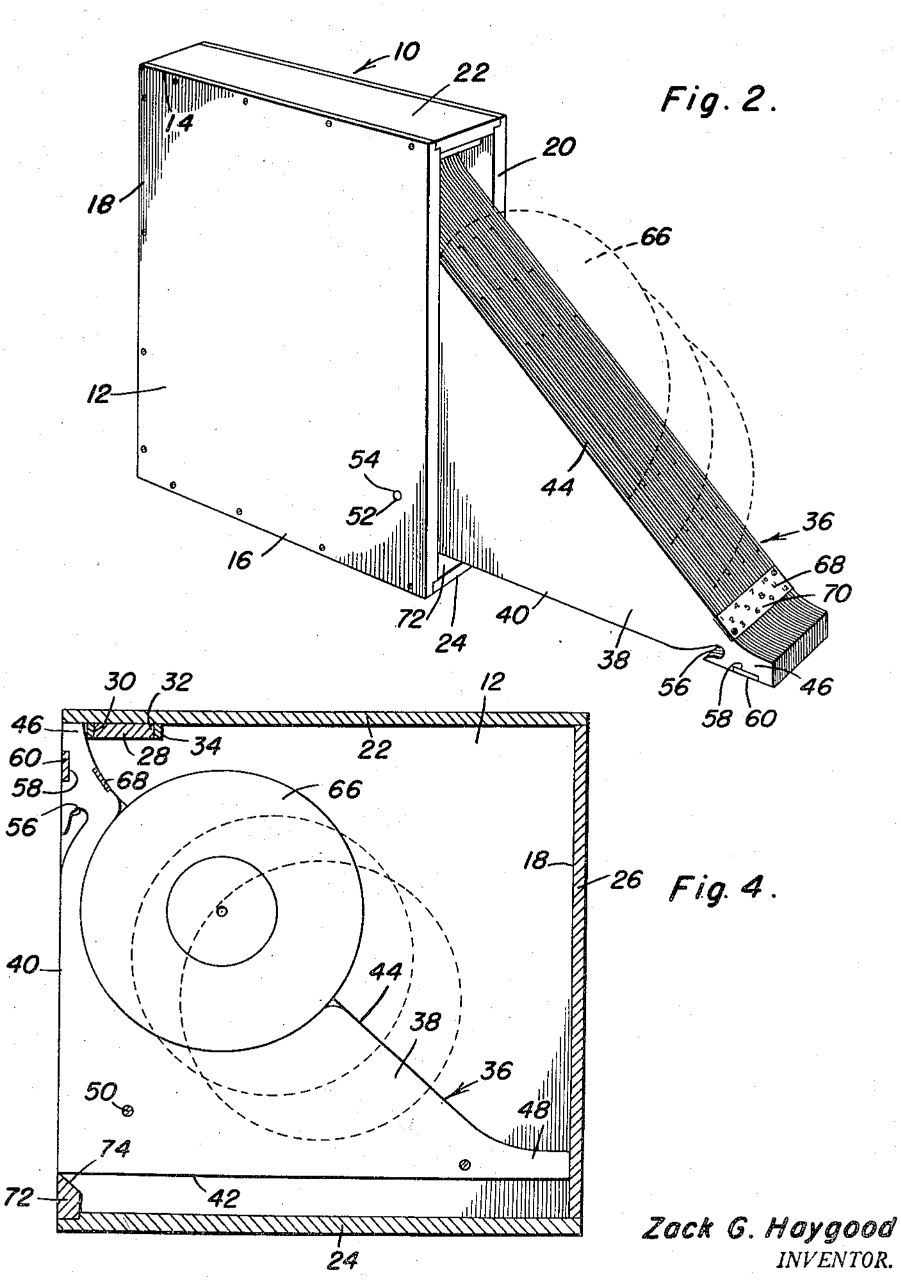
Figure 2 is a perspective view of the present cabinet showing the record case pivoted out of position from the housing, and with dotted lines showing a group of records applied to the case.

Referring now to the drawings in detail, wherein for the purpose of illustration, there is disclosed a preferred embodiment of the present invention, the numeral 10 represents a housing used in conjunction with the present invention generally, comprising a pair of spaced side members 12 having upper edges 14, lower edges 16, rear edges 18 and forward edges 20.

Removably secured between the edges 14, 16 and 18 respectively, is an upper wall 22, a bottom wall 24, and a rear wall 26. Rigidly secured to the inner face of wall 22, adjacent the free forward edges 20 of the side walls 12, is a substantially rectangular stop member 28 having abutting or bearing surfaces 30 and 32 that are covered by cushion strips or pads 34 for a purpose which will later be more fully described.

The numeral 36 represents the record case used in conjunction with the present invention generally. This case comprises a plurality of laminated juxtapositioned layers of substantially triangular sheets of wood 38. The leg portions or edges 40 and 42 of the adjacent sheets 38 are co-planar with regards to each other as well as the inclined edges 44 of the sheet 38, whereby the case is substantially triangular in appearance. Integrally formed with the juncture of the edges 40 and 42 with the edges 44, are projections 46 and 48 that afford bearing surfaces that respectively engage the pads 34 carried by bearing surfaces 30 and 32.

Extending transversely through these sheets 38 adjacent the juncture of edges 40 and 42, is a fixed pivot pin 50, the ends 52 of which pivotally engage sockets 54 provided in the side walls 12, adjacent their forward edges 20 and their lower edges 16.

It should be noted, that the case is so pivoted to the side walls, that when the case is in a normal or closed position within the housing 10, edges 40 of the sheets 38 will be co-planar with the forward edges 20 of the side walls 12, the edges 42 will be spaced parallel to the bottom wall 16, and the projection 46 will bear against the pads 34 carried by bearing portions 30.

Aligned notches 56 are provided in the edges 40 of the sheets 38, to facilitate the convenient pivotal movement of the case relative to the housing, and aligned notches 58 are also provided in the edges 40, adjacent the notches 56, for the reception of a suitable indicia bearing plate 60.

A plurality of groups of spaced parallel slots 62 are provided in the edges 44 of alternate sheets 38, and the slots of each group terminate adjacent each other, as at 64, so that records 66 placed therein for each group will be staggered relative to each other, facilitating the convenient placement or removal of a record from a selected slot.

Recessed in the edges 44 of the sheets 38, adjacent the projection 46, is a plate 68 having indicia 70 that is adapted to register with the slots 62.

Fixed to the bottom wall 24, adjacent edges 20, is an upstanding strip 72 provided with an inclined edge 74 that permits the pivotal movement of the case relative to the housing.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A phonograph record filing cabinet comprising a pair of vertical side walls, upper and lower horizontal walls joining said side walls a rear vertical wall mounted between said side walls and said upper and lower walls, a substantially right triangular case having a lower forward corner, an upper forward corner and a lower rear corner, a horizontal pivot extending through the lower forward corner of said case and said side walls, a stop carried by the upper wall of said cabinet for engaging the upper forward corner of said case when the case is swung into the cabinet and for engaging the lower rear corner of said case when the case is swung outwardly from the cabinet, said case including a joining wall between the upper and lower forward corners, and a strip rising from the bottom wall and engaging and supporting the case outwardly of the cabinet with the joining wall parallel to the bottom wall when the lower rear corner engages the stop, the lower rear corner of said case engaging said rear wall as the upper forward corner engages said stop.

2. The combination of claim 1 wherein said strip includes an upper downwardly and rearwardly inclined edge to permit the lower forward corner of said case to clear said strip as the case is swung outwardly from the case.

3. The combination of claim 1 wherein said upper forward corner and said lower rear corner are spaced apart sufficiently to permit rotation of said case 90° about said pivot.

ZACK G. HAYGOOD.

REFERENCES CITED

The following references are of record in the file of this patent:

UNITED STATES PATENTS

| Number | Name | Date |
|---|---|---|
| 1,184,060 | Yerkes | May 23, 1916 |
| 1,267,366 | Bousfield | May 28, 1918 |
| 1,336,382 | Schilingloff | Apr. 6, 1920 |
| 1,754,435 | Ray | Apr. 15, 1930 |
| 2,422,594 | Stengren | June 17, 1947 |

FOREIGN PATENTS

| Number | Country | Date |
|---|---|---|
| 105,774 | Great Britain | May 3, 1917 |
| 417,235 | Great Britain | Oct. 1, 1934 |
| 672,029 | France | Sept. 9, 1929 |